(12) United States Patent
Kamiya

(10) Patent No.: US 10,284,048 B2
(45) Date of Patent: May 7, 2019

(54) ELECTRIC MOTOR FOR SUPPRESSING ENTRY OF FOREIGN SUBSTANCES

(71) Applicant: FANUC CORPORATION, Yamanashi (JP)

(72) Inventor: Yohei Kamiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 19 days.

(21) Appl. No.: 15/725,371

(22) Filed: Oct. 5, 2017

(65) Prior Publication Data

US 2018/0115213 A1 Apr. 26, 2018

(30) Foreign Application Priority Data

Oct. 24, 2016 (JP) .................. 2016-207961

(51) Int. Cl.
*H02K 5/10* (2006.01)
*H02K 5/15* (2006.01)
(Continued)

(52) U.S. Cl.
CPC .............. *H02K 5/10* (2013.01); *B01D 45/14* (2013.01); *H02K 5/124* (2013.01); *H02K 5/15* (2013.01);
(Continued)

(58) Field of Classification Search
CPC ............ H02K 5/10; H02K 5/12; H02K 5/124; H02K 5/15; H02K 5/16; H02K 5/1732;
(Continued)

(56) References Cited

U.S. PATENT DOCUMENTS

| 2,938,661 A | * | 5/1960 | Ricketts | ................ F04D 29/102 |
| | | | | 415/111 |
| 5,235,228 A | * | 8/1993 | Nakanura | ................ F16F 15/30 |
| | | | | 310/168 |

(Continued)

FOREIGN PATENT DOCUMENTS

| JP | 54144018 U | 10/1979 |
| JP | 3307572 B | 7/2002 |

(Continued)

OTHER PUBLICATIONS

English Abstract and Machine Translation for Japanese Publication No. 2016086561 A, published May 19, 2016, 11 pgs.

(Continued)

*Primary Examiner* — Thomas Truong
*Assistant Examiner* — Rashad H Johnson
(74) *Attorney, Agent, or Firm* — Fredrikson & Byron, P.A.

(57) ABSTRACT

An electric motor is provided with an annular member supported by a cylindrical member of a front housing. The annular member includes an opposite part spaced from a surface of a ring member in a rotary shaft, which extends in the circumferential direction. The annular member includes first cover part opposed to first surface of the ring member, and second cover part opposed to second surface of the ring member. The first cover part and the second cover part are spaced from the ring member so that a pressure in a space sandwiched by the first cover part and the first surface is equalized with a pressure in a space sandwiched by the second cover part and the second surface.

4 Claims, 7 Drawing Sheets

(51) Int. Cl.
*B01D 45/14* (2006.01)
*H02K 15/00* (2006.01)
*H02K 5/124* (2006.01)
*H02K 5/18* (2006.01)
*H02K 5/12* (2006.01)
*H02K 7/08* (2006.01)
*H02K 7/14* (2006.01)

(52) U.S. Cl.
CPC .............. *H02K 15/00* (2013.01); *H02K 5/12* (2013.01); *H02K 5/18* (2013.01); *H02K 7/083* (2013.01); *H02K 7/14* (2013.01); *H02K 2205/09* (2013.01)

(58) Field of Classification Search
CPC ............ H02K 5/18; H02K 5/20; H02K 7/083; H02K 7/14; H02K 15/00; H02K 2205/09; B01D 45/14
USPC ........ 310/52, 54, 56, 62, 63, 64, 88, 89, 90, 310/401, 405, 406, 407, 417, 418
See application file for complete search history.

(56) References Cited

U.S. PATENT DOCUMENTS

| | | | | |
|---|---|---|---|---|
| 5,347,189 A * | 9/1994 | Chuta | ...................... | H02K 3/50 310/90 |
| 6,538,354 B2 | 3/2003 | Obara | | |
| 2001/0017498 A1* | 8/2001 | Matsuoka | ............ | H02K 5/1732 310/90 |
| 2007/0133911 A1* | 6/2007 | Nishimoto | ............ | F16C 33/107 384/100 |
| 2007/0183699 A1* | 8/2007 | Shishido | ............... | F16C 17/107 384/107 |
| 2014/0265737 A1* | 9/2014 | Yagi | .................. | H02K 15/0006 310/425 |
| 2015/0000549 A1* | 1/2015 | Nagayama | ............... | H02K 9/06 104/288 |
| 2015/0340922 A1* | 11/2015 | Kamiya | .................. | H02K 9/02 310/59 |
| 2015/0381007 A1* | 12/2015 | Oohara | .................... | H02K 5/10 310/59 |
| 2016/0118856 A1* | 4/2016 | Mukai | ................... | F16C 33/762 310/90 |
| 2016/0186861 A1* | 6/2016 | Kimura | .................. | F16J 15/002 277/349 |
| 2018/0115213 A1* | 4/2018 | Kamiya | ................ | B01D 45/14 |
| 2018/0183296 A1* | 6/2018 | Thalfah | ................ | H02K 5/1732 |
| 2018/0278117 A1* | 9/2018 | Katsuki | .................... | H02K 5/10 |

FOREIGN PATENT DOCUMENTS

| | | |
|---|---|---|
| JP | 200352145 A | 2/2003 |
| JP | 2015223022 A | 12/2015 |
| JP | 201686561 A | 5/2016 |

OTHER PUBLICATIONS

English Machine Translation and Abstract for Japanese Publication No. 2015223022 A, published Dec. 10, 2015, 8 pgs.
English Machine Translation and Abstract for Japanese Publication No. 2003052145 A, published Feb. 21, 2003, 5 pgs.
English Abstract and Machine Translation for Japanese Publication No. JPS54-144018 U, published Oct. 5, 1979, 5 pgs.
Untranslated Decision to Grant a Patent mailed by Japan Patent Office (JPO) for Application No. JP 2016-207961 dated Apr. 3, 2018, 3 pages.
English machine translation of Decision to Grant a Patent mailed by Japan Patent Office (JPO) for Application No. JP 2016-207961 dated Apr. 3, 2018, 3 pages.
Untranslated Notification of Reasons for Refusal mailed by Japan Patent Office (JPO) for Application No. JP 2016-207961 dated Jan. 30, 2018, 4 pages.
Translated Notification of Reasons for Refusal mailed by Japan Patent Office (JPO) for Application No. JP 2016-207961 dated Jan. 30, 2018, 3 pages.
English Abstract and Machine Translation for Japanese Publication No. 3307572 B, published Jul. 24, 2002, 19 pgs.

* cited by examiner

ELECTRIC MOTOR FOR SUPPRESSING ENTRY OF FOREIGN SUBSTANCES

BACKGROUND OF THE INVENTION

1. Field of the Invention

The present invention relates to an electric motor.

2. Description of the Related Art

Electric motors are used, in some cases, in an environment in which foreign substances scatter. For example, a spindle head of a machine tool is disposed in a processing chamber for processing a workpiece. The spindle head is used in an environment in which foreign substances such as chips occurring during cutting and cutting fluid scatter. The spindle head includes an electric motor for rotating a spindle. When foreign substances enter the inside of the electric motor, an insulation failure may occur in a coil, or a bearing function may be impaired.

Thus, it is preferable that the electric motor has a mechanism for preventing foreign substances from entering the inside of the electric motor. In a conventional technology, a configuration for preventing foreign substances from entering the inside through a clearance between a rotary shaft and a housing of the electric motor has been considered.

Japanese Unexamined Patent Publication No. 2003-52145 discloses that foreign substances are suppressed from entering the inside of the electric motor by disposing an oil seal that contacts the rotary shaft of the electric motor.

Japanese Unexamined Patent Publication No. 2016-86561 discloses an electric motor including first groove that is formed in the outer peripheral surface of a bearing and that has one end communicating with the internal space of a housing and the other end communicating with the external space of the housing, and second groove that is formed in the outer peripheral surface of the bearing and that extends in the circumferential direction of a rotary shaft. This publication discloses that compressed air that has passed through the first groove is sprayed to the rotary shaft.

Japanese Unexamined Patent Publication No. 2015-223022 discloses an electric motor in which compressed air is supplied from the outside to the inside of a front housing member. This publication discloses that an airflow passage for supplying the compressed air to a space around the bearing is formed in the front housing member.

SUMMARY OF THE INVENTION

In an electric motor that is driven at low rotation rate, an oil seal can be provided between a housing and a rotary shaft. However, in the case of an electric motor that is driven at high rotation rate, for example, at more than 8,000 rpm, an oil seal wears. Thus, a desired sealing function cannot be achieved in some cases.

Thus, a structure in which a slight clearance is formed between the rotary shaft and a member secured to the housing and air is supplied through the clearance, has been known. In this structure, when the electric motor is driven, the internal space has a negative pressure, and accordingly, when the electric motor stops, foreign substances may enter the inside. For this reason, as described in Japanese Unexamined Patent Publication No. 2015-223022, a problem arises in which a mechanism for supplying compressed air is necessary.

The electric motor of the present invention includes a rotor that includes a rotary shaft, and a housing that supports the rotary shaft and that is disposed on one side of the rotary shaft, which is coupled to another member. The electric motor includes an annular member that is supported by the housing. The rotary shaft includes an annular protrusion part that protrudes in the radial direction. The annular member includes an opposite part that is spaced from a surface of the protrusion part, which extends in the circumferential direction, by a predetermined distance. The annular member includes first cover part opposed to first surface of the protrusion part on one side, and second cover part opposed to second surface of the protrusion part on the other side. The first cover part is formed into a plate shape so as to extend in parallel with the first surface. The second cover part is formed into a plate shape so as to extend in parallel with the second surface. The first cover part and the second cover part are spaced from the protrusion part, so that a pressure in a space sandwiched by the first cover part and the first surface is equalized with a pressure in a space sandwiched by the second cover part and the second surface.

In the above invention, the surface roughness of the first surface can be identical to the surface roughness of the second surface. The distance between the first cover part and the first surface can be identical to the distance between the second cover part and the second surface. The radial length of the first cover part can be identical to the radial length of the second cover part.

In the above invention, one surface of the first surface and the second surface is formed so as to have a surface roughness larger than that of the other surface. One cover part of the first cover part and the second cover part can be opposed to the one surface, and the other cover part can be opposed to the other surface. The distance between the one cover part and the one surface can be set so as to be larger than the distance between the other cover part and the other surface.

In the above invention, one surface of the first surface and the second surface can be formed so as to have a surface roughness larger than that of the other surface. One cover part of the first cover part and the second cover part can be opposed to the one surface, and the other cover part can be opposed to the other surface. The radial length of the one cover part can be formed to be smaller than the radial length of the other cover part.

In the above invention, the opposite part can have a recessed part that is recessed toward outside in the radial direction.

In the above invention, the annular member can include an outside member that includes the first cover part and an inside member that includes the second cover part. The outside member can be secured to the inside member so as to be detached from the inside member.

DETAILED DESCRIPTION

With reference to FIG. 1 to FIG. 7, an electric motor in an embodiment will be described. The electric motor of the present embodiment is used in an environment in which foreign substances scatter. The electric motor of the present embodiment rotates a spindle to which a tool is attached in a machine tool. The electric motor of the present embodiment is disposed in the inside of a spindle head of the machine tool.

The spindle head is disposed in a processing chamber of the machine tool. Around the spindle head, there are foreign substances such as chips occurring when a workpiece is cut and droplets of cutting fluid that is sprayed into the processing chamber. The electric motor of the present embodiment has a structure for suppressing these foreign substances from entering the inside.

Figure 1:
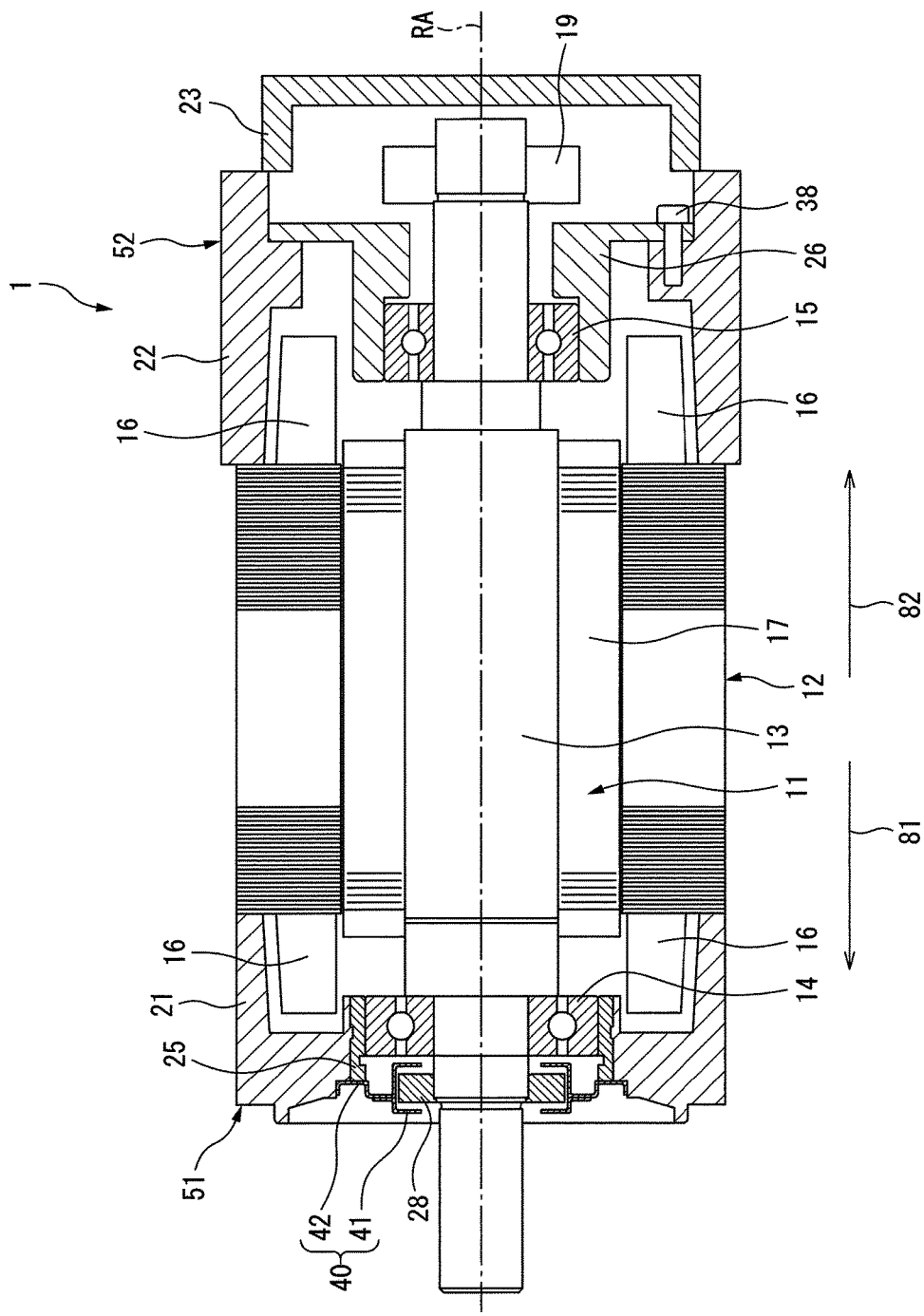
FIG. 1 is a sectional view of first electric motor in an embodiment.

FIG. 1 is a partial sectional view of first electric motor of the present embodiment. An electric motor 1 is provided with a rotor 11 and a stator 12. The stator 12 is formed by, for example, a plurality of magnetic steel plates that are axially stacked. A coil 16 is wound in the stator 12. The rotor 11 has a rotary shaft 13 and a rotor core 17 that is secured on the outside of the rotary shaft 13 and that has a plurality of magnets. The rotary shaft 13 is coupled to another member such as a spindle for transmitting a rotation force.

The rotary shaft 13 rotates about a rotation axis RA. The axial direction of the present embodiment represents the direction in which the rotation axis RA of the rotary shaft 13 extends. The radial direction of the present embodiment represents the radial direction of a circle that has a center at the rotation axis RA. The circumferential direction of the present embodiment represents the direction of the circumference of a circle that has a center at the rotation axis RA. Further, in the electric motor 1, the side of the rotary shaft 13 that is coupled to another member is referred to as the front side. Further, the side opposite to the front side is referred to as the rear side. In the example shown in FIG. 1, arrow 81 represents the front side of the electric motor 1, and arrow 82 represents the rear side of the electric motor 1.

The electric motor 1 includes, as a housing, a front housing 51 and a rear housing 52. The stator 12 is secured to the housing. Further, the housing rotatably support the rotor 11 via a bearing. The front housing 51 is disposed at one side of the rotary shaft 13 that is coupled to another member.

The rear housing 52 includes a cylindrical member 22 that is formed in a cylindrical shape and functions as a main body of the rear housing 52, and a bearing support member 26 for supporting a rear bearing 15. The bearing support member 26 is secured to the cylindrical member 22 by a bolt 38. The bearing support member 26 supports an outer ring of the rear bearing 15. An inner ring of the rear bearing 15 supports the rotary shaft 13.

An encoder 19 for detecting the rotational position and the rotation speed of the rotary shaft 13 is disposed at the rear end of the rotary shaft 13. A rear cover 23 for closing the inner space of the cylindrical member 22 is secured to the rear end of the cylindrical member 22.

The front housing 51 includes a cylindrical member 21 that is formed in a cylindrical shape and functions as a main body of the front housing. The stator 12 is secured to the cylindrical member 21 of the front housing 51 and the cylindrical member 22 of the rear housing 52. The rotary shaft 13 of the rotor 11 is supported by a front bearing 14 serving as a bearing that is supported by the cylindrical member 21, and the rear bearing 15 serving as a bearing that is supported by the cylindrical member 22.

Figure 2:
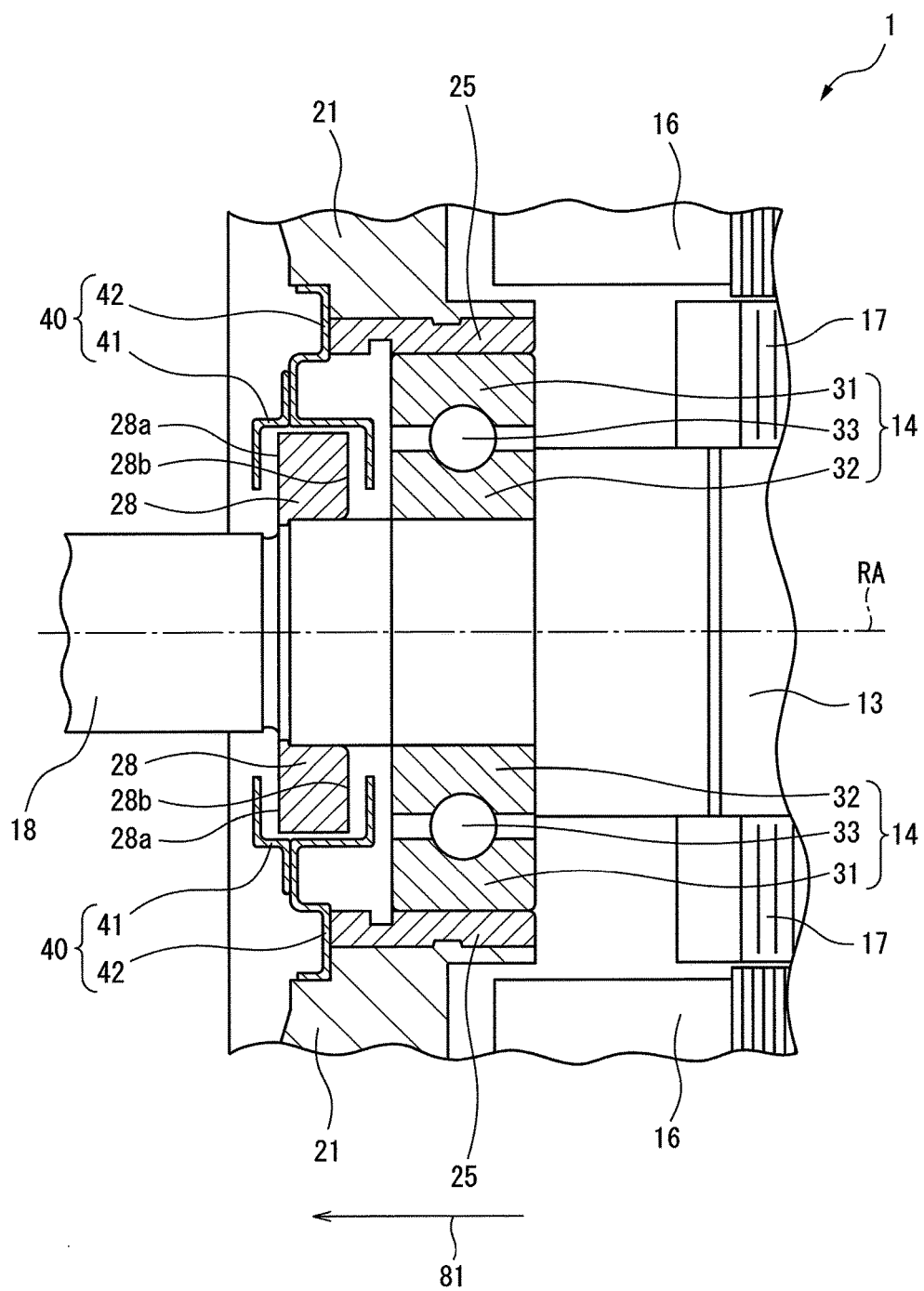
FIG. 2 is a sectional view of a part of an annular member and a ring member in the first electric motor.

FIG. 2 shows a partial sectional view obtained by cutting a portion that includes the front housing and the front bearing in the present embodiment. With reference to FIG. 1 and FIG. 2, the front housing 51 includes a bearing support member 25 that is secured to the cylindrical member 21. The bearing support member 25 supports the front bearing 14. The bearing support member 25 in the present embodiment is secured to the cylindrical member 21 by a bolt. Alternatively, the bearing support member 25 may be secured to the cylindrical member 21 by an adhesive agent. The bearing support member 25 is secured to the inner surface of the cylindrical member 21.

The front bearing 14 rotatably supports the front end of the rotary shaft 13. The front bearing 14 includes an outer ring 31, an inner ring 32, and balls 33 that are disposed between the outer ring 31 and the inner ring 32. The inner ring 32 rotates together with the rotary shaft 13. The bearing support member 25 secures the outer ring 31 of the front bearing 14. The bearing support member 25 is formed into an annular shape, and is formed so as to cover the front bearing 14 in the circumferential direction.

The rotary shaft 13 in the present embodiment includes a rod-like member 18 that is formed in a columnar shape, and a ring member 28 that functions as a protrusion part projecting from the circumferential surface of the rod-like member 18. The ring member 28 is also referred to as a finger. The ring member 28 protrudes in the radial direction. The ring member 28 is formed into an annular shape. The ring member 28 of the present embodiment is secured to the rod-like member 18 by shrink fitting. The ring member 28 in the present embodiment is formed so as to have a rectangular sectional shape. The ring member 28 has first surface 28a that is a front surface, and second surface 28b that is a rear surface. The first surface 28a and the second surface 28b are both formed into a planar shape.

The electric motor 1 is provided with an annular member 40 that is supported by the front housing 51. The annular member 40 is formed into an annular shape. The annular member 40 includes an outside member 41 that is disposed in an external space of the electric motor 1, and an inside member 42 that extends toward the inner space of the electric motor 1.

Figure 3:
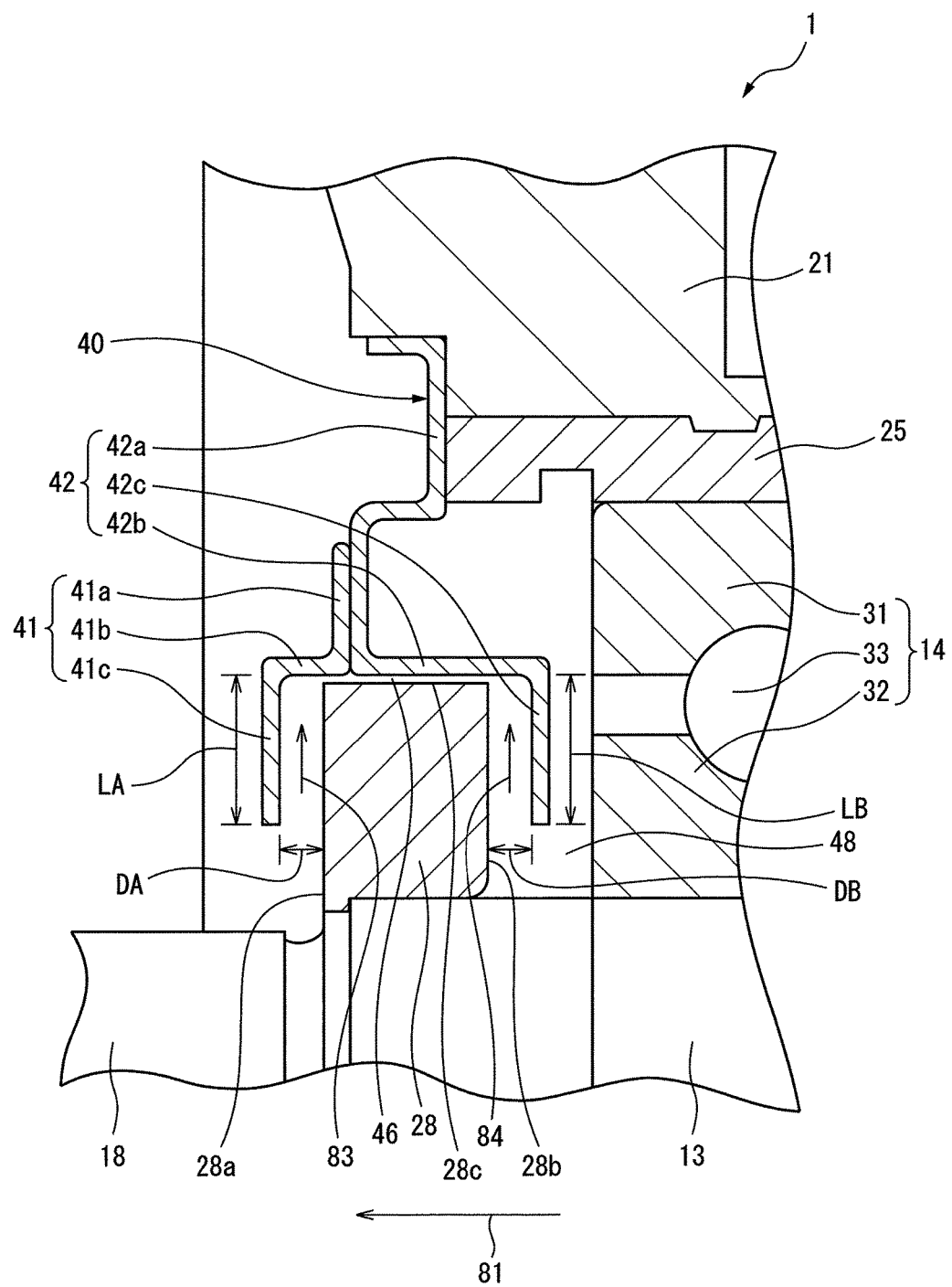
FIG. 3 is an enlarged sectional view of a part of the annular member and the ring member in the first electric motor.

FIG. 3 shows an enlarged partial sectional view of a portion that includes the annular member and the ring member. With reference to FIG. 2 and FIG. 3, the outside member 41 in the present embodiment is formed into a plate shape. The outside member 41 is formed into an annular shape so as to surround the ring member 28. The outside member 41 has a joint part 41a that is secured to the inside member 42. In the present embodiment, the joint part 41a is secured to the inside member 42 by an adhesive agent. The joint part 41a is not limited to this configuration, and may be secured to the inside member 42 by, for example, a fastening member such as a screw.

The outside member 41 has an opposite part 41b that is opposed to a surface 28c that extends in the circumferential direction of the ring member 28. The opposite part 41b is formed into a plate shape. The opposite part 41b is formed so as to extend in parallel with the surface 28c of the ring member 28. The opposite part 41b is formed along the surface 28c of the ring member 28. The opposite part 41b is formed so as to surround the ring member 28. The opposite part 41b is disposed so as to be spaced from the surface 28c of the ring member 28 by a predetermined distance.

The outside member 41 has first cover part 41c that is opposed to the first surface 28a of the ring member 28. The first cover part 41c is formed into a plate shape. The first cover part 41c is formed into an annular shape. The first surface 28a and the surface of the first cover part 41c are formed so as to be parallel to each other. The first cover part 41c is arranged so as to be spaced from the first surface 28a by a distance DA.

The inside member 42 in the present embodiment is formed into a plate shape. The inside member 42 is formed into an annular shape so as to surround the ring member 28. The inside member 42 has a joint part 42a that is secured to the cylindrical member 21 of the front housing 51. The inside member 42 is supported by the cylindrical member 21. In the present embodiment, the inside member 42 is secured to the cylindrical member 21 by an adhesive agent. The method for securing the inside member 42 is not limited to this embodiment, and may be secured to the cylindrical member 21 by, for example, a fastening member such as a screw.

The inside member 42 has an opposite part 42b that is opposed to the surface 28c that extends in the circumferential direction of the ring member 28. The opposite part 42b is formed into a plate shape. The opposite part 42b is formed along the surface 28c, i.e., the outer peripheral surface of the ring member 28. The opposite part 42b is formed so as to extend in parallel with the surface 28c of the ring member 28. The opposite part 42b is formed so as to surround the ring member 28. The opposite part 42b is arranged so as to be spaced from the surface 28c of the ring member 28 by a predetermined distance.

The inside member 42 has second cover part 42c that is opposed to the second surface 28b of the ring member 28. The second cover part 42c is formed into a plate shape. The second cover part 42c is formed into an annular shape. The second surface 28b is formed so as to be parallel to the surface of the second cover part 42c. The second cover part 42c is arranged so as to be spaced from the second surface 28b by a distance DB.

The opposite part 41b of the outside member 41 and the opposite part 42b of the inside member 42 are formed in the same plane. The opposite part 41b of the outside member 41 and the opposite part 42b of the inside member 42 constitute the opposite parts 41b and 42b of the annular member 40. The opposite parts 41b and 42b of the annular member 40 are formed into an annular shape. A gap part 46 is circumferentially formed between the opposite parts 41b and 42b of the annular member 40 and the surface 28c of the ring member 28. The gap part 46 is a small clearance, and constitutes a labyrinth passage. The gap part 46 of the present embodiment is formed so as to have a constant thickness in the axial direction.

In the first electric motor 1, the radial length LA of the first cover part 41c and the radial length LB of the second cover part 42c are formed so as to be identical to each other. Further, the distance DA between the first cover part 41c and the first surface 28a is formed so as to be identical to the distance DB between the second cover part 42c and the second surface 28b. Further, the surface roughness of the first surface 28a is formed so as to be identical to the surface roughness of the second surface 28b.

Figure 4:
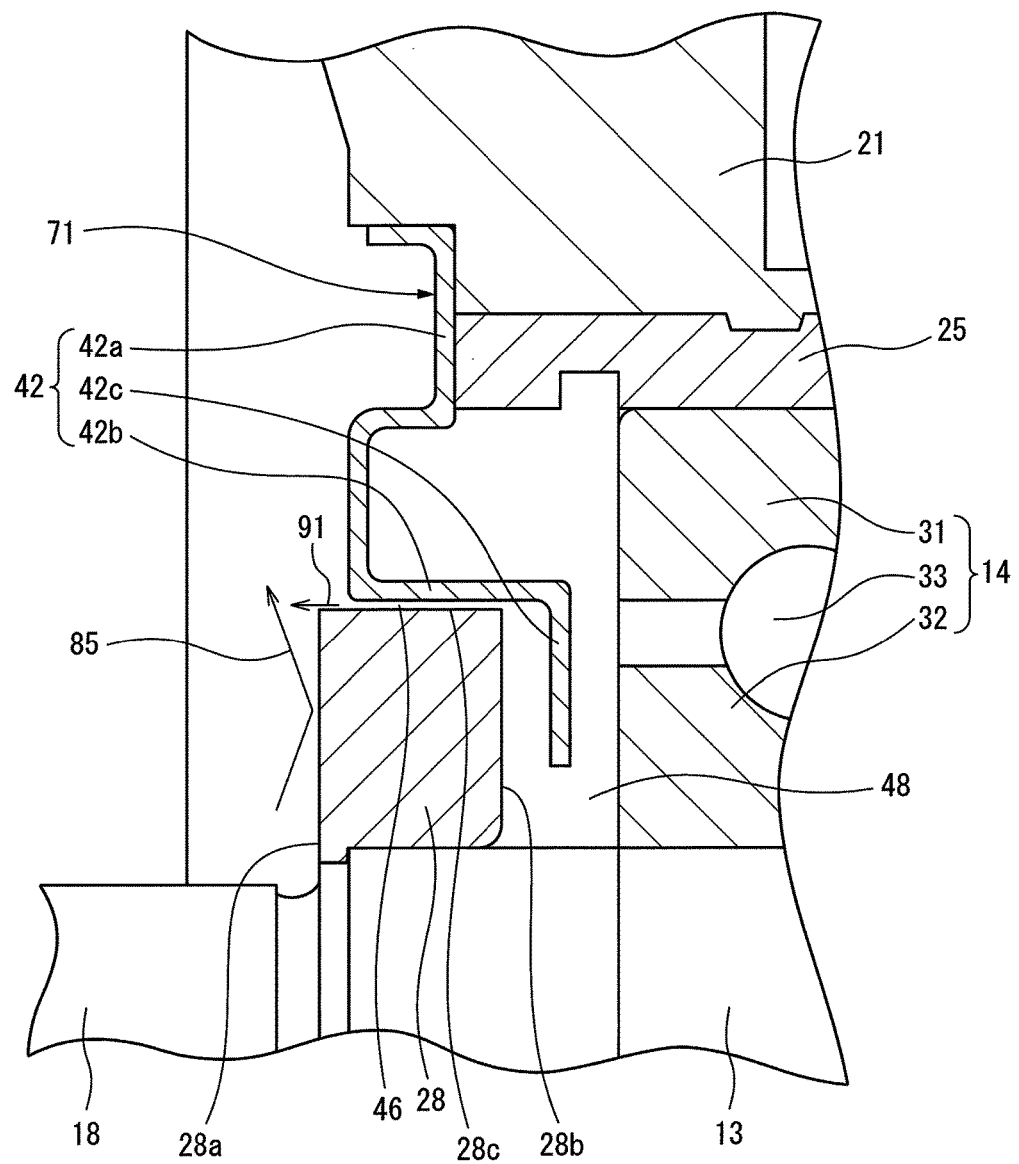
FIG. 4 is an enlarged sectional view of a part of an annular member and a ring member in an electric motor as a comparative example.

FIG. 4 shows an enlarged partial sectional view of a part that includes an annular member and a ring member in an electric motor of a comparative example. In the electric motor of the comparative example, an annular member 71 is comprised of the inside member 42. The annular member 71 includes the opposite part 42b that is opposed to the surface 28c extending in the circumferential direction of the ring member 28. The annular member 71 includes the second cover part 42c that is opposed to the second surface 28b of the ring member 28. An internal space 48 and the external space of the electric motor communicate with each other via the gap part 46.

When the electric motor is driven, the rotary shaft 13 including the ring member 28 rotates about the rotation axis. The gap part 46 functions as a flow passage of a labyrinth seal. The rotation of the rotary shaft 13 causes the ring member 28 to rotate about the rotation axis. Foreign substances in the vicinity of the first surface 28a of the ring member 28 are blown toward the outside in the radial direction by a centrifugal force as designated by arrow 85. Further, when the ring member 28 rotates, a centrifugal force is applied to the air around the ring member 28. Thus, when the electric motor is driven, the air is discharged from the internal space 48 through the gap part 46 as designated by arrow 91. The internal space 48 of the electric motor has a negative pressure. For this reason, the foreign substances are suppressed from entering the inside of the electric motor.

However, when the electric motor stops, the rotation of the rotary shaft 13 stops. The internal space 48 has a negative pressure, and accordingly, the outside air enters the inside through the gap part 46. In this respect, the foreign substances enter the internal space 48 together with air. As described above, in the electric motor of the comparative example, the foreign substances may enter the inside when the electric motor stops.

With reference to FIG. 3, in contrast, in the first electric motor 1 of the present embodiment, the annular member 40 has the first cover part 41c in addition to the second cover part 42c. When the electric motor 1 is driven, the rotary shaft 13 that includes the ring member 28 rotates. In a space sandwiched by the first cover part 41c and the first surface 28a, a force that causes the airflow toward the outside in the radial direction is applied to the air as designated by arrow 83. On the other hand, in a space sandwiched by the second cover part 42c and the second surface 28b, a force that causes the airflow toward the outside in the radial direction is applied to the air as designated by arrow 84. The force applied to the air as designated by arrow 83 and the force applied to the air as designated by arrow 84 cancel each other in the gap part 46. The pressure of the space sandwiched by the first cover part 41c and the first surface 28a and the pressure of the space sandwiched by the second cover part 42c and the second surface 28b are equalized. In the gap part 46, a state in which no airflow occurs can be maintained.

When the rotation speed of the electric motor 1 increases, the force designated by arrow 83 and the force designated by arrow 84 increase. Alternatively, when the rotation speed of the electric motor 1 decreases, the force designated by arrow 83 and the force designated by arrow 84 decrease. For this reason, at a given rotation speed of the electric motor 1, the airflow in the gap part 46 can be suppressed.

As seen above, in the electric motor 1 of the present embodiment, the pressure of the internal space 48 and the pressure of the external space can be maintained at substantially the same value. Consequently, the foreign substances can be suppressed from entering the inside of the electric motor 1 during the activation of the electric motor 1. Even when the rotation speed of the electric motor 1 decreases, foreign substances can be suppressed from entering the inside of the electric motor 1. Further, even when the electric motor 1 stops, foreign substances can be suppressed from entering the inside of the electric motor 1.

In the electric motor 1 of the present embodiment, even when air is not supplied to the portion that constitutes the flow passage of the labyrinth seal, the entry of foreign substances can be suppressed. In other words, it is not necessary to supply compressed air to the gap part 46, and a device for supplying air can be eliminated. Thus, in the electric motor 1 of the present embodiment, the entry of foreign substances can be suppressed by a simple structure.

As the annular member 40, any structure that can equalize the pressure of the space sandwiched by the first cover part 41c and the first surface 28a and the pressure of the space sandwiched by the second cover part 42c and the second surface 28b can be adopted. Next, an electric motor provided with another annular member in the present embodiment will be described.

Figure 5:
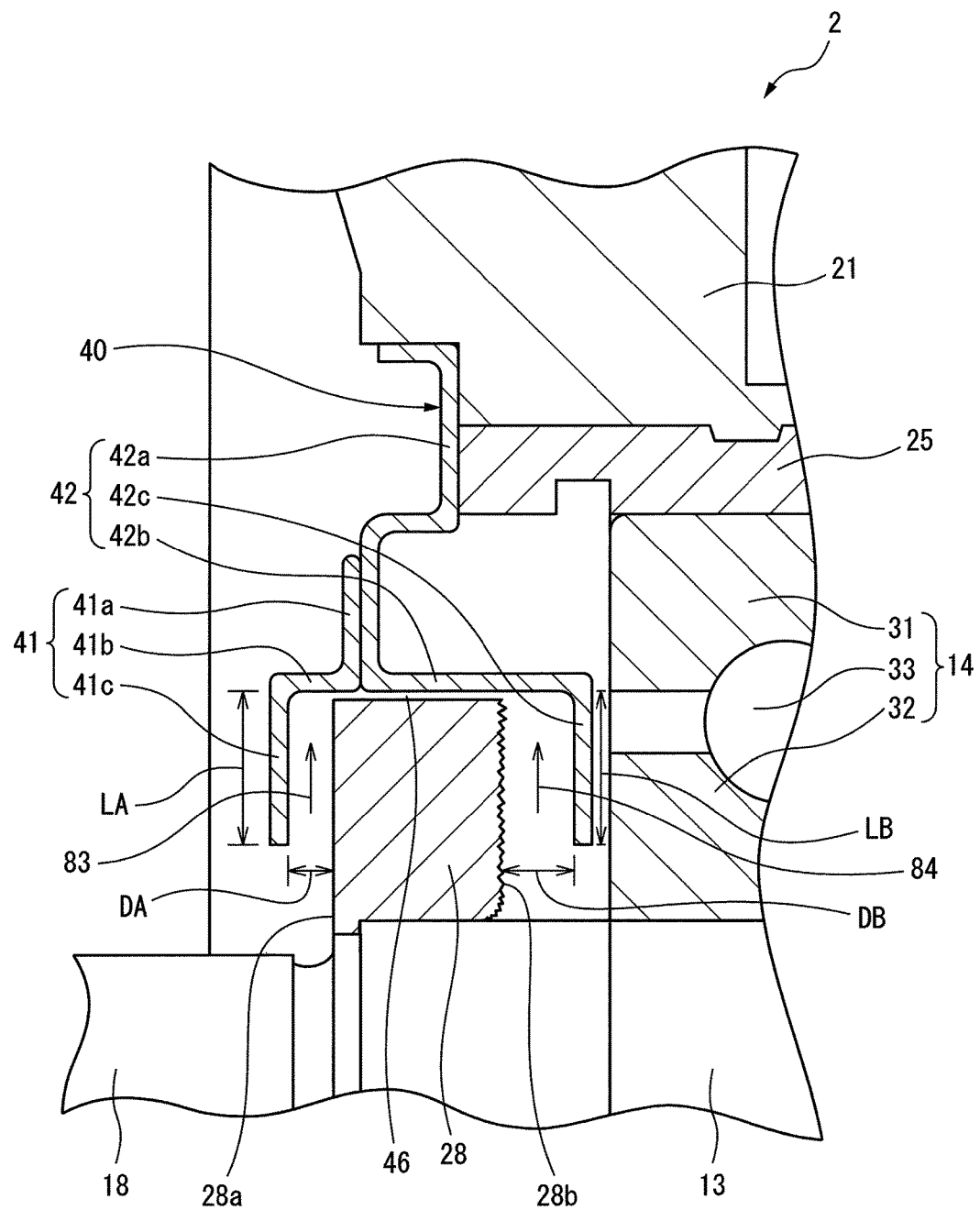
FIG. 5 is an enlarged sectional view of a part of an annular member and a ring member in second electric motor of the embodiment.

FIG. 5 shows an enlarged partial sectional view of a part that includes an annular member and a ring member in second electric motor of the present embodiment. In the ring member 28 of the second motor 2, the surface roughness of the first surface 28a and the surface roughness of the second surface 28b in the ring member 28 are different from each other. In an example shown in FIG. 5, the surface roughness of the second surface 28b is set so as to be larger than the surface roughness of the first surface 28a.

The radial length LA of the first cover part 41c is set so as to be identical to the radial length LB of the second cover part 42c. Since the surface roughness of the second surface 28b is large, the force applied to the air toward the gap part 46 by the second surface 28b as designated by the arrow 84, is larger than the force applied to the air toward the gap part 46 by the first surface 28a as designated by the arrow 83.

In the second electric motor 2, the distance DB between the second cover part 42c and the second surface 28b is set so as to be larger than the distance DA between the first cover part 41c and the first surface 28a. By adopting this configuration, the volume of the space sandwiched by the second cover part 42c and the second surface 28b is made to be larger than the volume of the space sandwiched by the first cover part 41c and the first surface 28a. Consequently, the pressure in the space sandwiched by the first cover part 41c and the first surface 28a and the pressure in the space sandwiched by the second cover part 42c and the second surface 28b can be equalized. In the gap part 46, the air can be suppressed from flowing, and the entry of foreign substances can be suppressed.

In an example different from the example, of the surface roughness shown in FIG. 5, when the surface roughness of the first surface 28a is larger than the surface roughness of the second surface 28b, a configuration in which the distance DA is larger than the distance DB can be employed. Even when this configuration is employed, the distance DA and the distance DB can be set so that the pressure in the space sandwiched by the first cover part 41c and the first surface 28a and the pressure in the space sandwiched by the second cover part 42c and the second surface 28b are equalized.

As seen above, when the surface roughness of one surface of the first surface 28a and the second surface 28b is formed so as to be larger than the surface roughness of the other surface, one cover part of the first cover part 41c and the second cover part 42c is opposed to the one surface, and the other cover part is opposed to the other surface. Further, the distance between the one surface and the one cover part can be set so as to be larger than the distance between the other surface and the other cover part. As illustrated in the second electric motor 2, the pressure in the space in front of the ring member 28 can be made to be equal to the pressure in the space behind the ring member 28 by adjusting the distance between the ring member 28 and each cover part.

Figure 6:
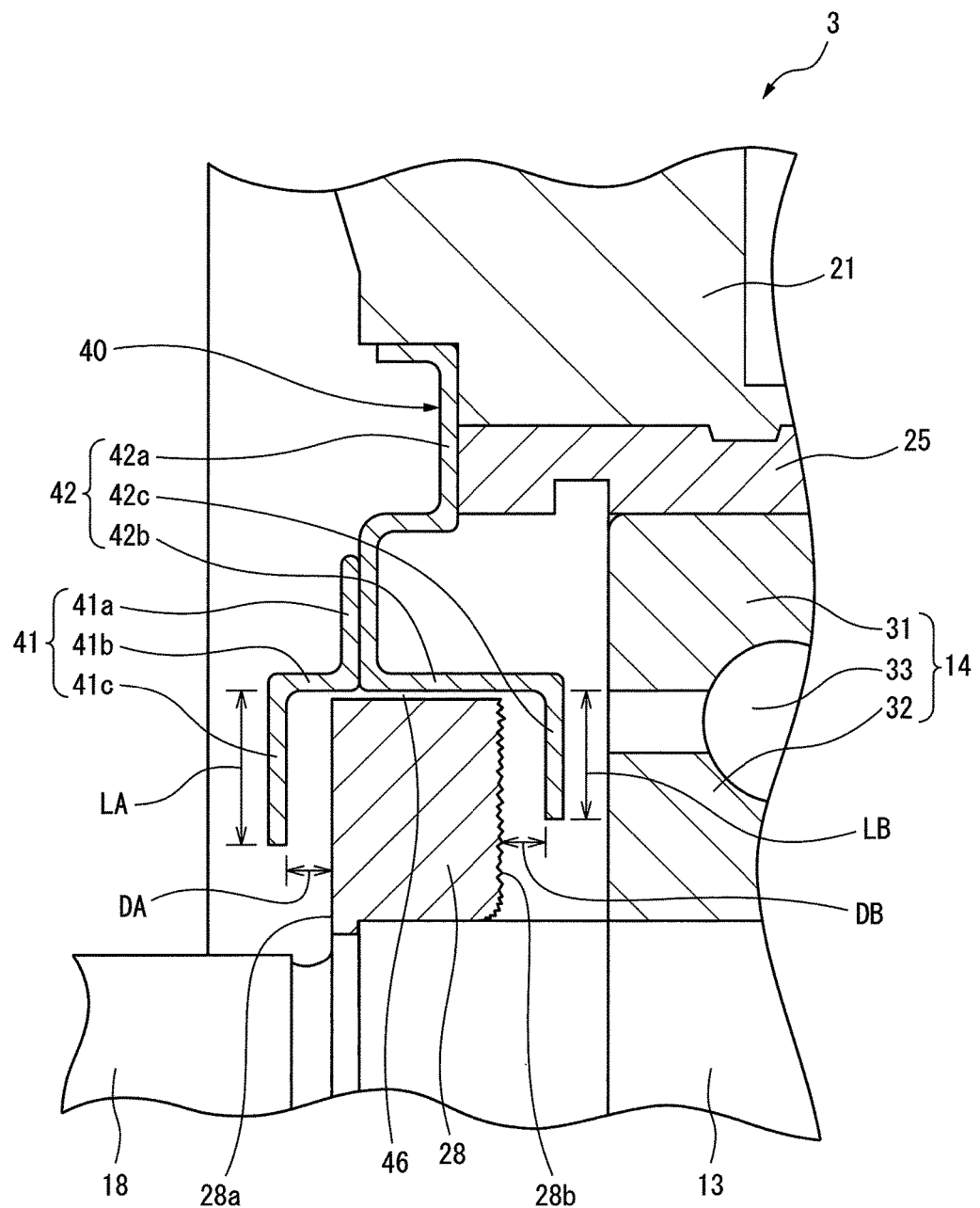
FIG. 6 is an enlarged sectional view of a part of an annular member and a ring member in third electric motor of the embodiment.

FIG. 6 shows an enlarged partial sectional view of a part that includes an annular member and a ring member in third electric motor of the present embodiment. In third electric motor 3, in the ring member 28, the surface roughness of the second surface 28b is larger than the surface roughness of the first surface 28a. The distance DA between the first cover part 41c and the first surface 28a is set to be identical to the distance DB between the second cover part 42c and the second surface 28b.

In the third electric motor 3, the radial length LB of the second cover part 42c is set so as to be smaller than the radial length LA of the first cover part 41c. By adopting this configuration, the radial length of the space sandwiched by the second cover part 42c and the second surface 28b is made to be smaller than the radial length of the space sandwiched by the first cover part 41c and the first surface 28a. Consequently, the pressure of the space sandwiched by the second cover part 42c and the second surface 28b can be equalized with the pressure of the space sandwiched by the first cover part 41c and the first surface 28a. The airflow can be suppressed in the gap part 46, whereby the entry of foreign substances can be suppressed.

In an example regarding a surface roughness that is different from the surface roughness shown in FIG. 6, the surface roughness of the first surface 28a is larger than the surface roughness of the second surface 28b in some cases. In this instance, a configuration in which the radial length LA of the first cover part 41c is smaller than the radial length LB of the second cover part 42c can be adopted.

As seen above, when the surface roughness of one surface of the first surface 28a and the second surface 28b is set so as to be larger than the surface roughness of the other surface, one cover part of the first cover part 41c and the second cover part 42c is opposed to the one surface, and the other cover part is opposed to the other surface. Further, the radial length of the one cover part can be set so as to be smaller than the radial length of the other cover part. As illustrated in the third electric motor 3, the pressure in the space in front of the ring member 28 can be made to be equal to the pressure in the space behind the ring member 28 by adjusting the radial length of each cover part.

Figure 7:
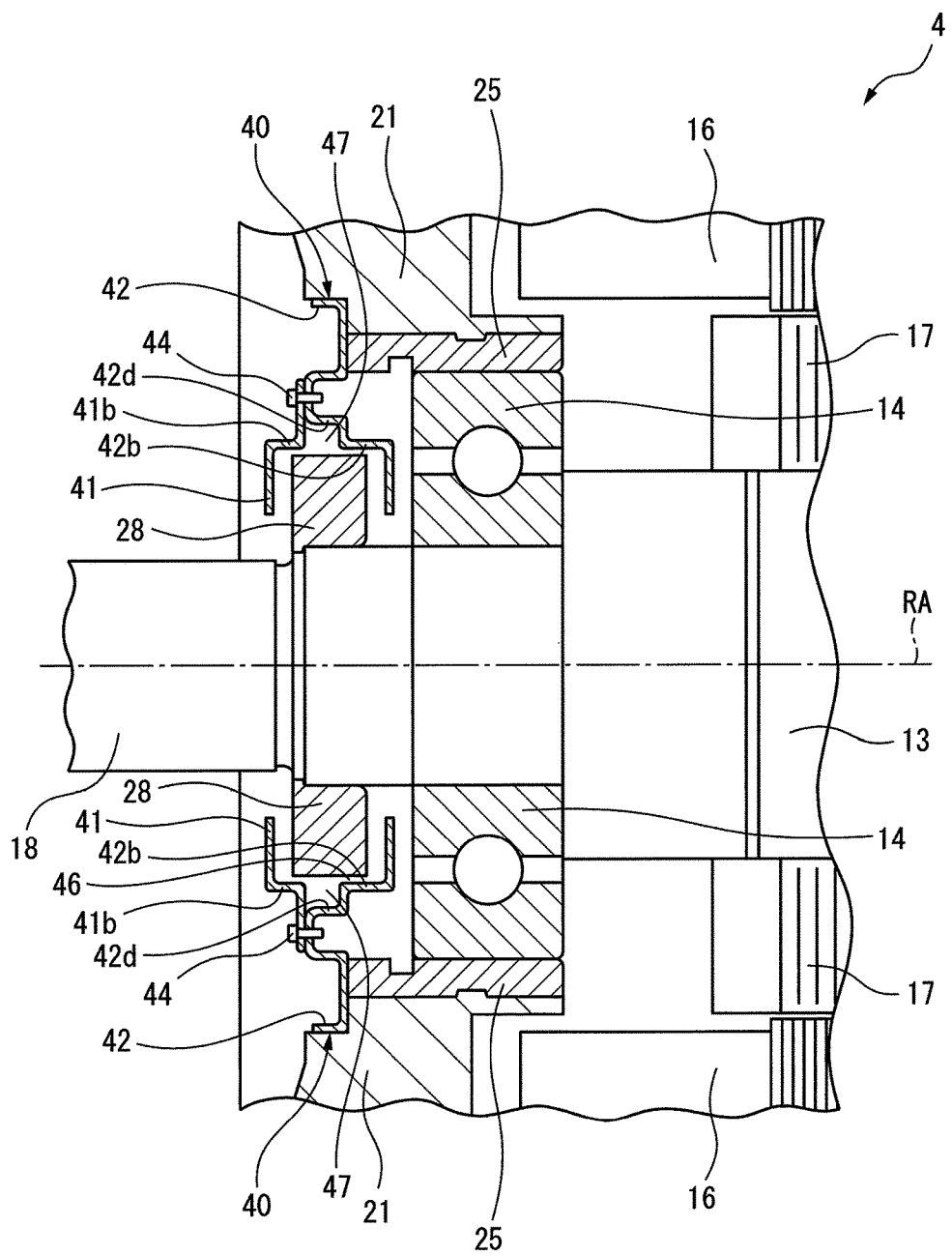
FIG. 7 is an enlarged sectional view of a part of an annular member and a ring member in fourth electric motor of the embodiment.

FIG. 7 shows a partial sectional view of a part that includes an annular member and a ring member in fourth electric motor of the present embodiment. In fourth electric motor 4, a recessed part 47 that is recessed toward outside in the radial direction is formed between the opposite parts 41b and 42b of the annular member 40. A curved part 42d is formed in the inside member 42. The space that is surrounded by the curved part 42d and the outside member 41 defines the recessed part 47. The recessed part 47 is formed along the surface 28c in the circumferential direction of the ring member 28. The recessed part 47 is formed into an annular shape so as to surround the ring member 28.

Foreign substances adhere to the first surface 28a and the second surface 28b of the ring member 28 in some cases. For example, foreign substances may adhere to the first surface 28a during a period in which the electric motor stops. The rotation of the rotary shaft 13 generates a centrifugal force around the ring member 28 so as to apply a force to the air outward in the radial direction. Further, the centrifugal force is applied to the foreign substances that adhere to the first surface 28a or the second surface 28b of the ring member 28. The foreign substances move outward in the radial direction along the first surface 28a or the second surface 28b.

In the present embodiment, the recessed part 47 is formed in an area in which the gap part 46 is formed. The foreign substances that move toward outside in the radial direction are accumulated in the recessed part 47. In other words, the recessed part 47 functions as a foreign substance reservoir. For this reason, the foreign substances can be suppressed from being left in the gap part 46. It is possible to suppress the rotation of the rotary shaft 13 from being hindered by foreign substances that is left in the gap part 46.

Further, in the fourth electric motor 4, the outside member 41 is formed so as to be detachable from the inside member 42. The outside member 41 is secured to the inside member 42 by screws 44 serving as fastening members. The screws 44 are arranged and spaced at predetermined intervals in the circumferential direction. The outside member 41 can be detached from the inside member 42 by removing the screws 44. When the outside member 41 is detached, the foreign substances that are accumulated in the recessed part 47 can be removed.

In the fourth electric motor 4, the outside member 41 is secured to the inside member 42 by the fastening members. However, the configuration is not limited to this embodiment, and any configuration in which the outside member 41 can be detached from the inside member 42 can be employed. For example, the outside member may be fit with the inside member in order to secure the outside member to the inside member.

Note that the outside member may be formed so as not to be detached from the inside member. For example, the outside member may be secured to the inside member by an adhesive agent.

The electric motor in the present embodiment is the electric motor for rotating the spindle of the machine tool. However, the invention is not limited to this embodiment, and the present invention can be applied to any electric motor that is disposed in an environment in which foreign substances may enter.

According to the present invention, the electric motor in which the entry of foreign substances is suppressed by a simple structure can be provided.

The aforementioned embodiments can be appropriately combined. In each figure described above, the same or similar members are designated with the same reference numerals. Note that the aforementioned embodiments are examples, and do not limit the present invention. Further, the embodiments include modifications of the features described in the claims.

The invention claimed is:

1. An electric motor comprising:
a rotor including a rotary shaft;
a housing that supports the rotary shaft and that is disposed on one side of the rotary shaft, coupled to another member; and
an annular member supported by the housing, wherein the rotary shaft includes an annular protrusion part protruding in the radial direction,
the annular member includes an opposite part spaced from a surface of the protrusion part, which extends in the circumferential direction, by a predetermined distance;
a first cover part opposed to a first surface of the protrusion part on the one side; and
a second cover part opposed to a second surface of the protrusion part on the other side, the first cover part is formed into a plate shape so as to extend in parallel with the first surface, the second cover part is formed into a plate shape so as to extend in parallel with the second surface,
the first cover part and the second cover part are spaced from the protrusion part so that a pressure in a space sandwiched by the first cover part and the first surface is equalized with a pressure in a space sandwiched by the second cover part and the second surface,
one surface of the first surface and the second surface is formed so as to have a surface roughness larger than that of the other surface,
one cover part of the first cover part and the second cover part is opposed to the one surface and the other cover part is opposed to the other surface, and
the distance between the one cover part and the one surface is larger than the distance between the other cover part and the other surface.

2. The electric motor according to claim 1, wherein the opposite part has a recessed part recessed toward outside in the radial direction.

3. The electric motor according to claim 2, wherein the annular member includes an outside member including the first cover part and an inside member including the second cover part, and the outside member is secured to the inside member so as to be detached from the inside member.

4. An electric motor comprising:
a rotor including a rotary shaft;
a housing that supports the rotary shaft and that is disposed on one side of the rotary shaft, coupled to another member; and
an annular member supported by the housing, wherein the rotary shaft includes an annular protrusion part protruding in the radial direction,
the annular member includes an opposite part spaced from a surface of the protrusion part, which extends in the circumferential direction, by a predetermined distance;
a first cover part opposed to a first surface of the protrusion part on the one side; and
a second cover part opposed to a second surface of the protrusion part on the other side,
the first cover part is formed into a plate shape so as to extend in parallel with the first surface,
the second cover part is formed into a plate shape so as to extend in parallel with the second surface,
the first cover part and the second cover part are spaced from the protrusion part so that a pressure in a space sandwiched by the first cover part and the first surface is equalized with a pressure in a space sandwiched by the second cover part and the second surface,
one surface of the first surface and the second surface is formed so as to have a surface roughness larger than that of the other surface,
one cover part of the first cover part and the second cover part is opposed to the one surface, and the other cover part is opposed to the other surface, and
the radial length of the one cover part is formed to be smaller than the radial length of the other cover part.

* * * * *